United States Patent
Plate et al.

(10) Patent No.: US 11,146,479 B2
(45) Date of Patent: Oct. 12, 2021

(54) REINFORCEMENT LEARNING-BASED INTELLIGENT CONTROL OF PACKET TRANSMISSIONS WITHIN AD-HOC NETWORKS

(71) Applicant: United States of America as represented by the Secretary of the Navy, San Diego, CA (US)

(72) Inventors: Randall S. Plate, San Diego, CA (US); Cherry Y. Wakayama, Poway, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 112 days.

(21) Appl. No.: 16/598,841

(22) Filed: Oct. 10, 2019

(65) Prior Publication Data
US 2021/0111988 A1    Apr. 15, 2021

(51) Int. Cl.
*H04L 12/751* (2013.01)
*H04L 12/64* (2006.01)
(Continued)

(52) U.S. Cl.
CPC .......... *H04L 45/08* (2013.01); *H04L 12/6418* (2013.01); *H04L 67/1023* (2013.01);
(Continued)

(58) Field of Classification Search
CPC . H04L 45/08; H04L 12/6418; H04L 67/1023; H04W 40/026; H04W 40/20; H04W 40/248; H04W 40/26; H04W 84/18
See application file for complete search history.

(56) References Cited

U.S. PATENT DOCUMENTS 8,036,224 B2 * 10/2011 Axelsson ................ H04L 45/00
                                                            370/395.21
8,644,267 B2    2/2014 Sato
(Continued)

OTHER PUBLICATIONS

D. Pompili and I.F. Akyidiz, Overview of networking protocols for underwater wireless communication. IEEE. Commun. Mag., Feature Topic on Underwater Wireless Communications, Jan. 2009.
(Continued)

*Primary Examiner* — Dhairya A Patel
*Assistant Examiner* — Eui H Kim
(74) *Attorney, Agent, or Firm* — Naval Information Warfare Center, Pacific; Kyle Eppele; James R. McGee

(57) ABSTRACT

At a source node, a plurality of packets may be determined for transmission to a destination node in a network comprising a plurality of network nodes. A transmission rate of the plurality of packets from the source node to a neighbor node in the network may be adaptively controlled, based on a determination of a current status of the network by utilizing a plurality of parameters that are estimated via a reinforcement learning routing algorithm. The plurality of parameters include an estimated cost value representing a current cost to transmit the plurality of packets to the destination node via the network. Transmissions from intermediate nodes may also be adaptively deferred based on a determination of a current status of the network by utilizing the plurality of parameters.

19 Claims, 8 Drawing Sheets

(51) Int. Cl.
H04L 29/08 (2006.01)
H04W 40/26 (2009.01)
H04W 40/02 (2009.01)
H04W 40/24 (2009.01)
H04W 84/18 (2009.01)
H04W 40/20 (2009.01)

(52) U.S. Cl.
CPC ......... H04W 40/026 (2013.01); H04W 40/20 (2013.01); H04W 40/248 (2013.01); H04W 40/26 (2013.01); H04W 84/18 (2013.01); H04L 2012/6443 (2013.01)

(56) References Cited

U.S. PATENT DOCUMENTS

| | | | | |
|---|---|---|---|---|
| 9,191,304 | B1* | 11/2015 | Plate | H04L 12/6418 |
| 9,240,955 | B1 | 1/2016 | Mukhopadhyay | |
| 2006/0165025 | A1* | 7/2006 | Singh | H04L 45/02 |
| | | | | 370/315 |
| 2009/0138415 | A1 | 5/2009 | Lancaster | |
| 2010/0054195 | A1* | 3/2010 | Agbaria | H04W 4/029 |
| | | | | 370/329 |
| 2010/0271934 | A1* | 10/2010 | Holliday | H04W 40/24 |
| | | | | 370/221 |
| 2010/0316049 | A1* | 12/2010 | Diab | H04L 12/12 |
| | | | | 370/389 |
| 2011/0164527 | A1* | 7/2011 | Mishra | H04L 45/123 |
| | | | | 370/252 |
| 2013/0187787 | A1 | 7/2013 | Damus | |
| 2013/0235737 | A1* | 9/2013 | Merlin | H04W 74/0808 |
| | | | | 370/252 |
| 2014/0192715 | A1* | 7/2014 | Tickoo | H04W 40/08 |
| | | | | 370/328 |
| 2014/0269286 | A1* | 9/2014 | Reches | H04L 47/564 |
| | | | | 370/230.1 |
| 2015/0049737 | A1* | 2/2015 | Yang | H04W 36/30 |
| | | | | 370/332 |
| 2015/0200846 | A1* | 7/2015 | Hui | H04L 45/70 |
| | | | | 370/253 |
| 2016/0127042 | A1 | 5/2016 | Farr | |
| 2016/0294505 | A1* | 10/2016 | Turner | H04L 1/0002 |
| 2017/0183068 | A1 | 6/2017 | Lindman | |
| 2018/0302172 | A1 | 10/2018 | Petrioli | |

OTHER PUBLICATIONS

C. Ma and Y. Yang, Battery-aware routing for steaming data transmissions in wireless sensor networks. In Proc. Intl. Symp. Mobile Ad hoc Networking & Computing, pp. 230-241, 2005.

P. Xie, J.H. Cui and L. Lao, VBF: Vector-based forwarding protocol for underwater sensor networks. In Proc. Networking, pp. 1216-1221, 2006.

H. Yan, J. Shi, and J.H. Cui DBR: Depth-based routing for underwater sensor networks. In Proc. Networking, pp. 72-86, 2008.

T. Hu and Y. Fei, Qelar: A machine-learning-based adaptive routing protocol for energy-efficient and lifetime-extended underwater sensor networks. IEEE Trans. Mobile Computing, 9(6):798-809, Jun. 2010.

S. Kumar and R. Miikkulainen, Dual reinforcement q-routing: An on-line adaptive routing algorithm, In Proc. Articial Neural Networks in Eng. Conf., 1997.

J. Broch, D.A. Maltz, D.B. Johnson, Y. Hu, and J. Jetcheva. A performance comparison of multi-hop wireless ad hoc network routing protocols. Proc. of IEEE International Conference on Mobile Computing and Networking, Oct. 1998.

P. Xie, Z. Zhou, Z. Peng, H. Yan, T. Hu, J. Cui, Z. Shi, Y. Fei, and S. Zhou. Aqua-sim: An ns-2 based simulator for underwater sensor networks. Oceans 2009, MTS/IEEE Biloxi-Marine Technology for Our Future: Global and Local Challenges, Oct. 2009.

M. Chitre, S. Shahabudeen, L . . . Freitag, and M. Stojanavic. Recent advances in underwater acoustic communications and networking. In Proc. MTS/IEEE Oceans, Quebec City, Canada, Sep. 2008.

I. F. Akyidiz, D. Pompili, and T. Melodia. State of the art in protocol research for underwater acoustic sensor networks. In Proc. Sigmobile-Mobile Computing Comm. Rev., vol. 11, pp. 11-22, 2007.

J. A. Boyan and M. L. Littman. Packet routing in dynamically changing networks: A reinforcement learning approach, In Proc. Advances in Neural Information Processing Systems, vol. 6, pp. 671-678, 1994.

V. Di Valerio, C. Petrioli, L. Pescosolido, and M. Van Der Shaar, A reinforcement learning-based data-link protocol for underwater acoustic communications. In Proceedings of the 10th International Conference on Underwater Networks & Systems (WUWNET '15), Article No. 2, 2015.

E. A. A. Alaoui, S. Agoujil, M. Hajar, and Y. Qaraai, The performance of DTN routing pProtocols: a comparative study. WSEAS Transactions on Communications, vol. 14, pp. 121-130, 2015.

J. Burgess, B. Gallagher, D. Jensen, B. N. Levine, MaxProp: Routing for Vehicle-Based Disruption-Tolerant Networks. In Proc. IEEE INFOCOM 2006, 25th IEEE International Conference on Computer Communications, pp. 1688-1698, 2006.

R. Plate and C. Wakayama, Utilizing kinematics and selective sweeping in reinforcement learning-based routing algorithms for underwater networks. Ad Hoc Networks 34 (2015), Elsevier, pp. 105-120, 2015.

J. Wu, S.Yang, and F. Dai, Logarithmic store-carry-forward routing in mobile ad hoc networks. IEEE Trans. on Parallel and Distributed Systems, vol. 18, No. 6, Jun. 2007, pp. 736-748.

* cited by examiner

1102
Adaptively Control, at a Source Node in a Network of a Plurality of Network Nodes, a Generation Rate of Generating, at the First Network Node, a Plurality of Generated Packets for Transmission to a Destination Node in the Network of the Plurality of Network Nodes, by an Adaptive Controller that Controls Transmission of Generated Packets 1104
Adaptively Control a Rate of Transmission of the Plurality of Generated Packets From the Source Node to a Node in the Network of the Plurality of Network Nodes, Based on a Determination of a Current Status of the Network of the Plurality of Network Nodes by Utilizing a Plurality of Parameters that are Estimated Via a Reinforcement Learning Routing Algorithm, the Plurality of Parameters Including an Estimated Cost Value Representing a Current Cost to Transmit the Plurality of Packets to the Destination Node Via the Network of the Plurality of Network Nodes 1106
Receive, at the Source Node, a Plurality of Received Packets from an Intermediate Node of the Network of the Plurality of Network Nodes 1108
Adaptively Defer a Transmission of the Plurality of Received Packets from the Source Node to a Neighbor Node of the Source Node in the Network of the Plurality of Network Nodes, Based on a Determination of an Estimated V-value of the Neighbor Node, a Change in a V-value of the Source Node, and an Availability of a Network Transmission Path from the Source Node to the Destination Node, Wherein the V-value is Determined Based on the Reinforcement Learning Routing Algorithm, Wherein the V-value Represents a Current Cost Associated with Transmitting the Plurality of Received Packets from the Source Node to the Destination Node

FIG. 11

REINFORCEMENT LEARNING-BASED INTELLIGENT CONTROL OF PACKET TRANSMISSIONS WITHIN AD-HOC NETWORKS

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104,125.

BACKGROUND

Routing packets among unmanned nodes is a component of underwater networks, the operation of which is complicated by the harsh underwater environment characterized by low bandwidth, large latency, high energy consumption, and node mobility. Nodes need to be able to relay information throughout the network in an efficient manner and adapt autonomously to topology changes. Issues may be caused by intermittent underwater networks whereby nodes may attempt to forward packets to a destination node that is currently unreachable. Previous methods of addressing underwater routing issues have relied on limiting assumptions, such as that all nodes know the locations, link costs, etc., of all other network assets. Other methods limit their application to homogeneous networks, networks without mobile nodes, small networks, or centralized architectures.

SUMMARY

According to one general aspect, a method may include determining, at a source node, a plurality of packets for transmission to a destination node in a network comprising a plurality of network nodes. A transmission rate of the plurality of packets from the source node to a neighbor node in the network may be adaptively controlled, based on a determination of a current status of the network by utilizing a plurality of parameters that are estimated via a reinforcement learning routing algorithm, the plurality of parameters including an estimated cost value representing a current cost to transmit the plurality of packets to the destination node via the network.

According to another aspect, a method may include receiving, at an intermediate node, from a source node, a plurality of packets for transmission to a destination node in a network comprising a plurality of network nodes. A transmission of the plurality of packets from the intermediate node to a neighbor node of the intermediate node in the network may be adaptively deferred, based on a determination of an estimated V-value of the neighbor node, a change in a V-value of the intermediate node, and an availability of a network transmission path from the intermediate node to the destination node, wherein the V-value is determined based on a reinforcement learning routing algorithm, wherein the V-value represents a current cost associated with transmitting the plurality of packets from the intermediate node to the destination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

BRIEF DESCRIPTION OF THE DRAWINGS

FIG. 11 is a flowchart illustrating adaptive packet generation and adaptive packet deferred transmission operations.

DETAILED DESCRIPTION

Issues may be caused by intermittent underwater networks whereby nodes attempt to forward packets to a destination node that is currently unreachable. In accordance with example techniques discussed herein, information obtained through a reinforcement learning framework may be leveraged to control the transmission of packets during times of low probability of reaching the destination node, for example, in order to reduce network congestion and energy usage. Packets may be controlled at a source node in terms of faster or slower generation rate, and at intermediate nodes in terms of when and how long to hold on to packets instead of transmitting immediately.

Figure 1:
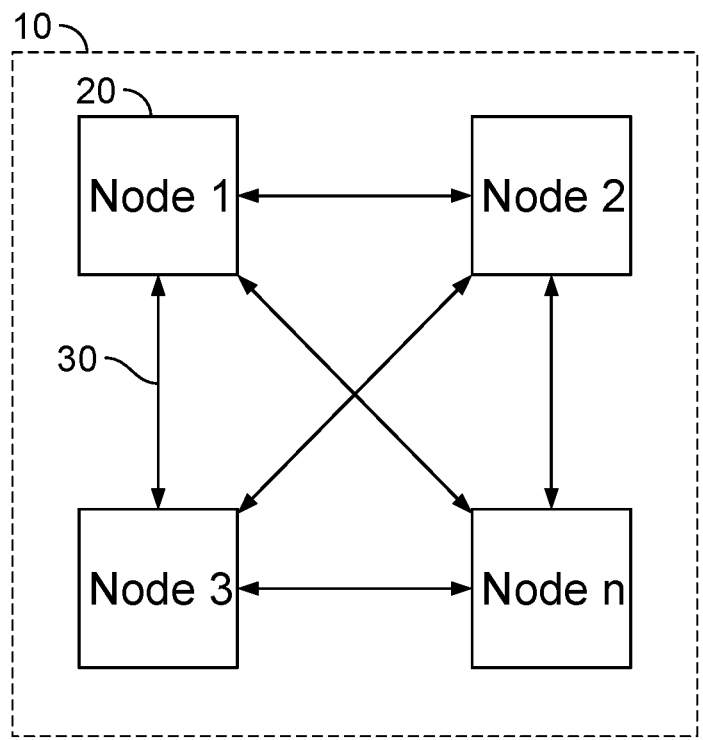
FIG. 1 is a block diagram of an example system having a distributed network architecture.

FIG. 1 is a block diagram of an example system 10 having a distributed network architecture that may be used to implement techniques discussed herein. System 10 may include a plurality of nodes 20 that are each configured to send signals 30 to each of the other nodes 20 and receive signals 30 from each of the other nodes 20. Nodes 20 may be organized in any type of distributed network configuration. In some embodiments, nodes 20 are fixed in their location within the network. In some embodiments, nodes 20 are mobile and are able to move about within the network. In some embodiments, system 10 may include both fixed and mobile nodes. In some embodiments, nodes 20 comprise sensors that may be used to detect objects within an environment.

Figure 2:
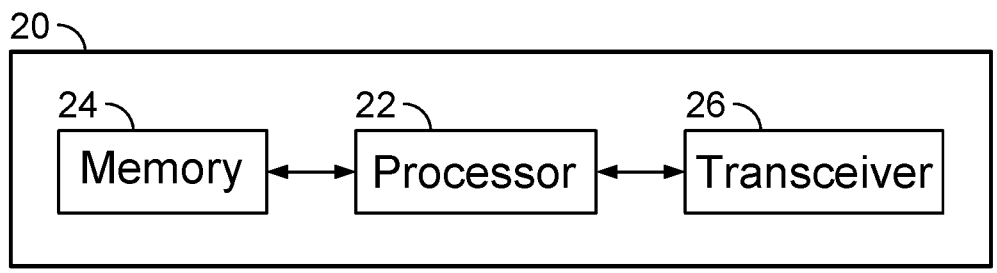
FIG. 2 is a block diagram of an example node in the distributed network architecture shown in FIG. 1.

FIG. 2 is a block diagram of an example of a node 20. As shown, node 20 includes a processor 22 operatively connected to a memory unit 24 and a transceiver 26. In some embodiments, processor 22 is a general purpose processor. In some embodiments, processor 22 is a processor that is specifically programmed to contain instructions therein, readable by the processor, that allow the processor to send/receive information to/from memory unit 24 and transceiver 26, as well as to cause transceiver 26 to send/receive signals in accordance with embodiments discussed herein. Further, depending on the particular application of the node, e.g., a sensor, node 20 may include more components therein to allow the node to perform functions required by the specific application.

Communications may be desired between various underwater assets, both fixed and mobile, that create an ad-hoc disconnected, intermittent, low-bandwidth (DIL) network. A routing technique has been described in U.S. Pat. No. 9,191,304, entitled "Reinforcement learning-based distributed network routing method utilizing integrated tracking and selective sweeping," with inventors R. Plate and C. Wakayama ("the '304 patent" hereinafter), which is incorporated by reference herein, and in R. Plate, C. Wakayama, "Utilizing kinematics and selective-sweeping in reinforcement learning-based routing algorithms for underwater networks," *Ad Hoc Networks*, Elsevier, Vol. 34, pp. 105-120, Nov. 30, 2015 ("Plate et al." hereinafter), that utilizes reinforcement learning to learn the topology of such a network, track and adapt to it over time, and route packets over multi-hop links from a source node to a destination node. It is possible for certain nodes to, at one time, be along the best path to the destination, and then to become disconnected from the destination. If this occurs, routing packets amongst these nodes may no longer be profitable. For example, it may result in excessive network congestion and wasted energy in transmitting and receiving packets. In order to combat this problem, a technique may first detect that such a situation has occurred. It then may detect when these nodes become connected once more, and instruct nodes to hold on to packets they need to relay until this time. The concept of operations of the routing technique in the '304 patent and Plate et al. is that the network is distributed, and thus the algorithm for deferring transmissions may be autonomous and enable each node to make these decisions individually without the aid of a centralized control center. Thus, each node may determine its own cost for transmitting packets to destination nodes, and may broadcast its information (including that node's cost values) in packet headers.

In this context, a "best path" refers to a network path that currently has a lowest cost associated with the path, for transmitting packets to the destination node. Further, a "best neighbor" of a particular network node refers to a neighbor node that currently has a lowest cost associated with it, for transmitting packets to that neighbor node and then from the neighbor node to the destination node. For the particular network node, a "neighbor node" refers to a network node that is capable of receiving transmissions from the particular network node, with no intermediary network nodes in the transmissions between the particular network node and its neighbor node. Further, a "beneficial neighbor" of a particular network node refers to a neighbor node that currently has a lower cost associated with it than the particular network node, for transmitting packets from the relevant node to the destination node.

There have been attempts at addressing DIL network issues in the Radio Frequency (RF) networking community (e.g., as discussed in E. A. A. Alaoui, et al., "The performance of DTN routing protocols: a comparative study," *WSEAS Transactions on Communications*, Vol. 14, pp. 121-130, 2015). These solutions may not perform well underwater due to the significantly lower bandwidths, larger latencies, multi-path challenges, and limited energy resources. Alternative approaches to solving this problem for underwater networks have various approaches to estimate the status of the network, from centralized control centers to statistical models. Other approaches utilize control over the movement of the vehicles in a store-carry-forward type architecture (e.g., as discussed in J. Wu, et al., "Logarithmic store-carry-forward routing in mobile ad hoc networks," *IEEE Transactions on Parallel and Distributed Systems*, Vol. 18, No. 6, June 2007, pp. 736-748) or data ferrying (e.g., as discussed in J. Burgess, et al., "MaxProp: Routing for Vehicle-Based Disruption-Tolerant Networks," *In Proc. IEEE INFOCOM 2006, 25TH IEEE International Conference on Computer Communications*, pp. 1688-1698, 2006). In contrast, example techniques discussed herein may utilize information obtained via reinforcement learning to intelligently detect disconnected situations and control packet transmissions accordingly.

For example, techniques discussed herein may leverage properties of the reinforcement learning routing algorithm of the '304 patent and Plate et al. in order to estimate the status of the network and then use this information to control packet flow. Further brief explanation of Q-learning and a baseline algorithm are discussed further below.

First, shared geographic data is used by each node to calculate and relay an estimate of the temporal duration and confidence value of the path from itself to the destination node. This may be calculated in terms of a path start time (t_start), end time (t_end), and confidence value. The t_start and t_end calculations are based on the times when a node's best neighbor node will enter and exit, respectively, its own communication range. A confidence value is related to the number of hops away from the destination the node is, with each hop decreasing the confidence value by a selected fraction, as discussed further below.

This information may then be leveraged in two ways to control packet flow. First, it may be used at the source (packet generating) node to compute an optimal packet generation rate that is anticipated to utilize the available channel capacity, without flooding the network. Second, it may be used by all nodes in the network to help determine whether or not to relay packets immediately, or defer transmission until a more opportune time. The defer transmission logic may also leverage the estimated V-values of neighbor nodes that are inherent to the routing algorithm in the '304 patent and Plate et al., and the change in self V-value ($\Delta V$), that was computed as part of the selective sweeping portion of routing algorithm. If $\Delta V$ is greater than a chosen threshold, this indicates that the network has not yet converged and packets are not deferred in order to allow learning to take place. However, if $\Delta V$ is less than the threshold, packets can be held if it is determined that no valid neighbors exist to which to forward the packet.

A flow chart describing this logic is illustrated in FIGS. 4-8.

Packet delivery adaptation may be advantageous to prevent network congestion as well as wasted resources (e.g., energy) in the case of an unreachable destination. It is well-known that these issues exist in DIL networks. In accordance with example techniques discussed herein, the parameters estimated using a reinforcement learning routing algorithm may be utilized to provide information to inform a packet delivery control algorithm about the status of the network and to adapt the forwarding of packets based on this information.

Specifically, features of this algorithm may include: (1) an adaptive source control component based on estimation of the path to the destination, and (2) deferring forwarding of packets based on the V-values of neighbor nodes, a node's own change in V-value ($\Delta V$), and the availability of a path to the destination.

There are various tradeoffs that could be employed in the logic of the algorithm. For example, when a packet is received at a node and there is a valid transmission path to the destination node and multiple packets are waiting in that node's buffer, one or more additional packets may be transmitted immediately from the buffer. Transmitting more packets at a time has the potential for getting the packets to the destination node faster, but possibly also causing congestion in the network.

Example techniques discussed herein may be applied to many different configurations of underwater networks, involving different quantities, types, and topologies of nodes. For example, they may be used for intermittent links caused by mobility, changes in the environment, changes in node energy, or other factors. Although underwater networks are discussed herein, example techniques discussed herein may be applied to terrestrial networks as well (with modifications to adjust performance for the different network characteristics). In addition, for underwater networks, it may be implemented using multiple modalities including acoustics, optics, or RF.

As discussed above, in order to most efficiently utilize the network, it may be desirable for the source node to adapt its packet generation rate to the state of the network. If the network is unknown, the reinforcement learning methodology may tend to send packets in an inefficient manner to the destination node in order to learn the topology. During this phase, too many packets can flood the network and prevent any transmissions from being completed due to excessive interference. Thus, the source node may transmit new packets at a relatively slow rate. However, once the network is learned and a reliable transmission path to the destination node exists, a significantly faster packet generation rate may be supported without flooding the network, due to packets being efficiently routed to the destination node.

It is also possible to adapt packet size as the network is learned. That is, the source may transmit shorter packets when learning is taking place. However, this may cause issues with the reinforcement learning because the probabilities of successful transmission may decrease with longer packets, thereby changing the V-values of the nodes, creating a "moving target" for nodes to find.

Part of the adaptive source algorithm is the ability for the source node to estimate when a transmission path to the destination node has been identified, how long that transmission path will persist due to node mobility, and the quality of that transmission path. Based on this information, the source node may increase its packet generation rate during times when it estimates that packets can reliably reach the destination node.

Figure 3:
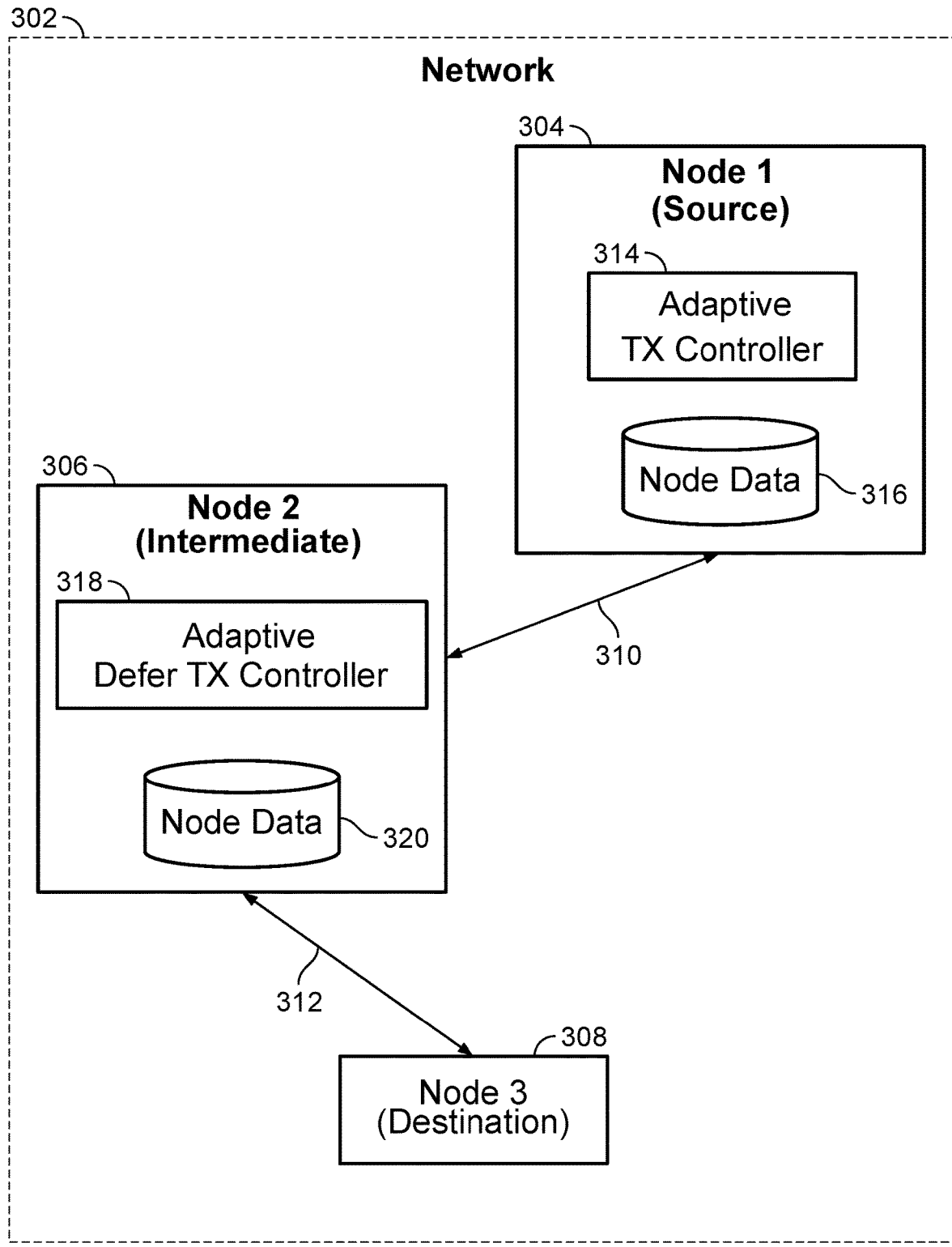
FIG. 3 is a block diagram of an example distributed network with a source node, an intermediate node, and a destination node.

FIG. 3 is a block diagram of a system for adaptively controlling packet transmissions, in accordance with example techniques discussed herein. As shown in FIG. 3, a network 302 includes at least three network nodes: a source node 304, an intermediate node 306, and a destination node 308. The network nodes are capable of bidirectional transmissions between nodes over transmission media 310 and 312. Although not shown in FIG. 3, there may exist one or more additional network nodes in a transmission path between intermediate node 306 and destination node 308.

As shown in FIG. 3, source node 304 includes an adaptive TX controller 314 and storage 316 for node data. Intermediate node 306 includes an adaptive Defer TX controller 318 and storage 320 for node data. Destination node 308 may currently receive transmissions from source node 304 via a transmission path through intermediate node 306. As discussed further herein, adaptive TX controller 314 may control transmission of packets by adaptively generating, at source node 304, a plurality of packets for transmission to destination node 308. Adaptive TX controller 314 may further adaptively control a transmission of the plurality of packets from source node 304 to intermediate node 306, based on a determination of a current status of network 302 by utilizing a plurality of parameters that are estimated via a reinforcement learning routing algorithm, the plurality of parameters including an estimated cost value representing a current cost to transmit the plurality of packets to destination node 308 via network 302. For example, the parameters may be stored in storage 316.

Additionally, a plurality of packets may be received at intermediate node 306 from source node 304, for transmission to destination node 308 in network 302. Adaptive Defer TX controller 318 may serve to control adaptively deferring a transmission of the plurality of packets from intermediate node 306 to a neighbor node, based on a determination of an estimated V-value of the neighbor node, a change in a V-value of intermediate node 306, and an availability of a network transmission path from intermediate node 306 to destination node 308. The V-value is determined based on a reinforcement learning routing algorithm, wherein the V-value represents a current cost associated with transmitting the plurality of packets from intermediate node 306 to destination node 308. Data such as the V-values may be stored in storage 320.

Although not shown, adaptive TX controller 314 and adaptive Defer TX controller 318 may both be included in a single network node that may act as both a source node and an intermediate node for transmission of packets.

Below is a discussion of example techniques for estimating the quality of a source-destination path.

In addition to V-values $V_d$, $V_s$, and other metadata, each network node may maintain the following estimates:

(1) $t_{start}$: the time when a transmission path to the destination node through the best neighbor node will begin. This may be the present time, or a time in the future based on forecast network node motion;

(2) $t_{end}$: the time when a transmission path to the destination node through the best neighbor node will end; and (3) reliability: the estimated end-to-end probability of successfully transmitting a packet along the best path to the destination node.

A window (e.g., a temporal window) of transmission path availability from a given node to the destination node is given by [$t_{start}$, $t_{end}$]. These window start and end times are calculated as the times when a node's best neighbor is within its acoustic transmission range (assuming maximum capable/allowable transmission power).

Additionally, a window when a transmission path to a destination node is valid may be calculated, such that $t_{start}$ is when the neighboring node (destination node in this case) first enters communications range; $t_{end}$ is when it leaves. Communications range is defined as the distance where a transmission has at least some user-defined likelihood to succeed (e.g., 95% probable to succeed).

Values of these three parameters ($t_{start}$, $t_{end}$, reliability) are included in the packet header when a network node forwards a packet, and thereby, are relayed to its neighbors.

Each network node will compute the temporal window to its best neighbor in order to reach the destination node. As this information is relayed back towards the source node, each hop along the transmission path introduces a reduction in probability (e.g., $0.95^N$, where N is the number of hops traversed thus far) and (potentially) a further reduction in temporal window duration (if its own link does not last as long as the links further up the chain). It may be noted that if network nodes are stationary, then $t_{end}=\infty$ and the temporal window will always be valid.

An example packet generation rate computation is discussed below.

Given a $t_{start}$, $t_{end}$, and confidence value estimate, a packet generation rate may be computed by the application layer.

First, a maximum packet generation rate, $R_{max}$, may be computed based on the time involved to transmit the packet, receive the packet, the propagation time, and the time for an acknowledge packet to be sent and received. Therefore, $$R_{max} = \left[ \frac{2*bitsPerDataPkt}{bitRate} + 2*t_{prop} + \frac{2*ackBits}{bitRate} \right]^{-1} \quad (1)$$

Note that $R_{max}$ only needs to be calculated once assuming packet sizes are fixed. In one scenario, the adaptive source control (e.g., adaptive TX controller 314) may alter both packet size and generation rate. However, varying packet size may alter the probabilities of success and therefore the V-values, which may cause issues in the reinforcement learning paradigm as it tries to converge to these V-values.

Next, two scaling factors are computed to weight the window length ($\Delta$) and confidence value of the transmission path (C). The longer the length of the time window (temporal window) where the transmission path is estimated to be valid, the more the packet generation rate may be increased. Similarly, the higher the confidence value, the higher the rate may be. These scaling factors may be determined as:

$$\Delta_{scale} = \begin{cases} 0, & \text{if } (t_{end} - t_{start}) < \delta_{min} \\ 1, & \text{if } (t_{end} - t_{start}) > \delta_{max} \\ \frac{(t_{end} - t_{start}) - \delta_{min}}{\delta_{max} - \delta_{min}}, & \text{otherwise} \end{cases} \quad (2)$$

where $\delta_{min}$ and $\delta_{max}$ are predefined constants defining the range of window lengths over which it is desired to adapt, and $$C_{scale} = \begin{cases} 0, & \text{if } (t_{end} - t_{start}) < \delta_{min} \\ 1, & \text{if } (t_{end} - t_{start}) > \delta_{max} \\ \frac{C - C_{min}}{C_{max} - C_{min}}, & \text{otherwise} \end{cases} \quad (3)$$

where C is the packet confidence value and $C_{min}$ and $C_{max}$ are predefined constants specifying the range of confidence values to be considered.

A final, overall, scaling factor may then be determined as:

$$s = \text{aggressiveness} * \Delta_{scale} * C_{scale} * (t_{start} \leq t_{current}) * (t_{end} > t_{current}) \quad (4)$$

where there are three additional terms: a parameter from [0, 1] that defines how aggressive the adaptive source node should be, and the last two terms which restrict the source node from adapting if the current time is not within the valid temporal window.

Finally, the new packet generation rate may be determined as:

$$R = R_{min} + s(R_{max} - R_{min}) \quad (5)$$

where $R_{min}$ and $R_{max}$ are defined by the user as the minimum rate to be allowed (i.e., the rate that may be used to initially learn the network) and the maximum rate to be allowed, respectively.

With regard to deferred transmissions, when a network node receives a packet to transmit, it may not be desirable for that network node to forward it immediately. Various scenarios exist where it may be advantageous for the network node to hold on to the packet temporarily and transmit it at a later time. Two such scenarios are:

(1) When a network node has the best V-value amongst all its neighbor nodes. This case can arise, for example, due to the destination node moving such that it is no longer reachable for a period of time, or a subset of network nodes becoming disconnected from the network. In this case, it is desirable for that node to hold on to packets it receives in hopes of regaining a beneficial neighbor node in the future rather than transmitting a packet in a detrimental direction.

(2) When a network node estimates that in the near future it will be closer to its best neighbor node.

Holding onto the packet temporarily could enable the network node to take advantage of the relative motion between itself and its neighbor node, thereby:

(a) Achieving a higher probability of success for its acoustic transmission; and (b) Entering a configuration where it will be possible to transmit optically to a neighbor node that is currently reachable only acoustically.

Energy may be advantageously conserved by deferring transmissions if a network node is unable to send a packet anywhere beneficial due to that node not having a path to the destination node. When the network node detects a better neighbor node to which to forward the packet, it may then transmit the packet(s) it has at that time.

Optical transmissions may occur relatively rarely for a randomly dispersed network with non-coordinated movement. Deferring transmission until a future time when the network node is closer to the desired neighbor node may increase the opportunities for optical transmissions, which may also result in energy savings.

Figure 6:
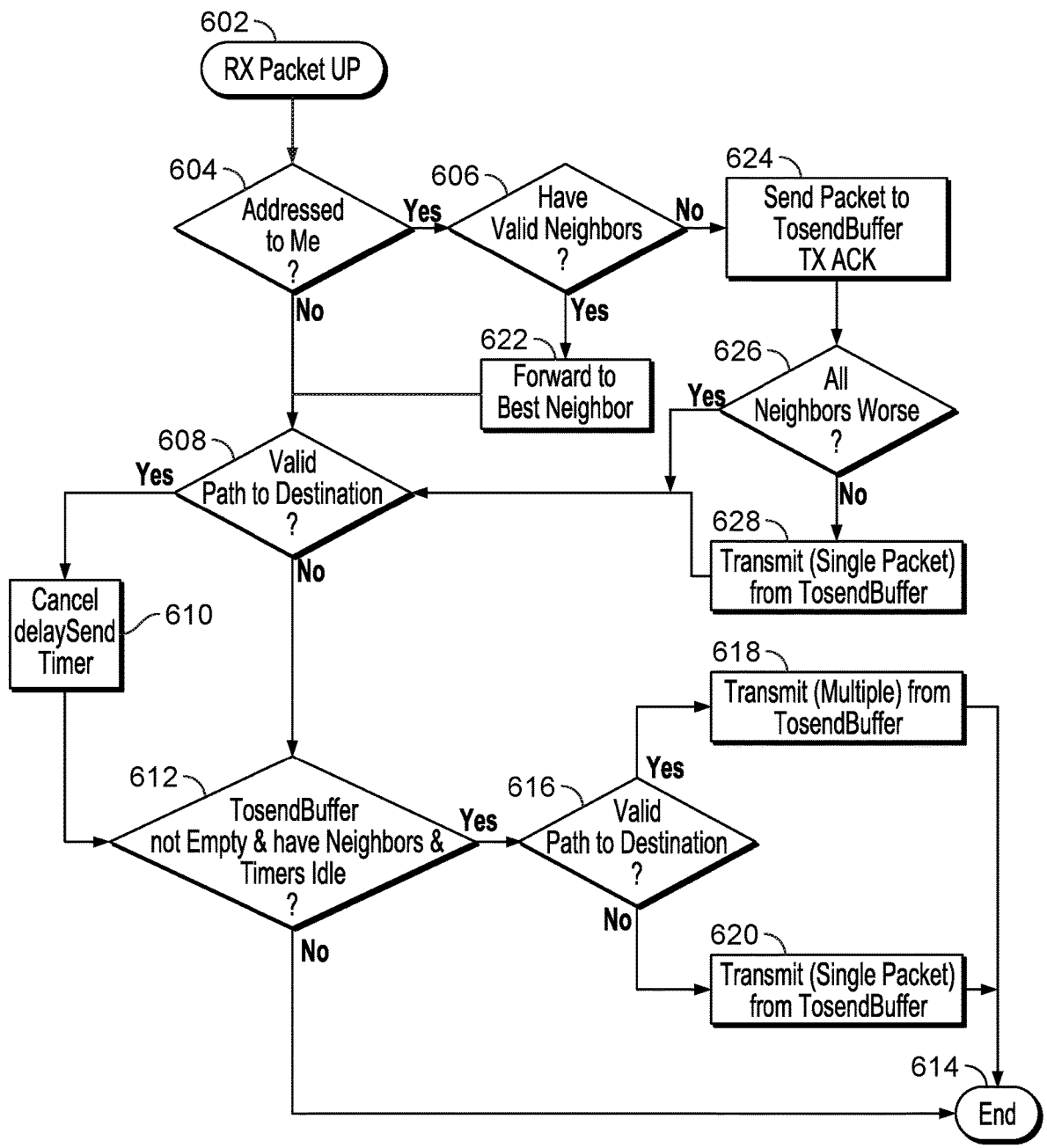

Scenario 1: all neighbors worse. If a network node estimates that all of its neighbor nodes have a worse V-value than itself, it may be advantageous not to transmit at all rather than transmit in a detrimental direction. A block diagram of example algorithm logic to implement the deferred transmission logic for the case where all neighbors are worse is shown in FIG. 6.

An exception to this rule may occur when the network is being learned and network node estimates are not very accurate. A network node may incorrectly think that a neighbor node is worse when in fact it simply needs to correct its estimate of that neighbor's V-value. In this situation, each node's estimate of its own V-value will be changing significantly with each packet received. For example, this change in V-value may be tracked over time to determine the state of the network for use in the backward sweeping capability discussed herein.

When a packet is received by a network node, it updates its own V-estimate using the information in the packet and computes its change in V-value, $\Delta V$. If $\Delta V$ is greater than a predefined threshold, a backwards sweeping packet is generated to share this updated information with its neighbor nodes. In this way, significant changes may be propagated back toward the source node faster than just relying on normal packet forwarding.

The deferred transmission logic leverages this same $\Delta V$ computation to determine if changes are occurring in the network or not. If so, the network node will not hold on to the packet but will forward to its best neighbor node, even if that neighbor node has a worse V-value, because the network node still needs to learn the network and it is likely that a transmission path to the destination node in fact exists and needs to be discovered. However, a small value of $\Delta V$ may indicate that the network is well estimated and that there truly is no good neighbor node to which to forward the packet at the current time.

Figure 4:
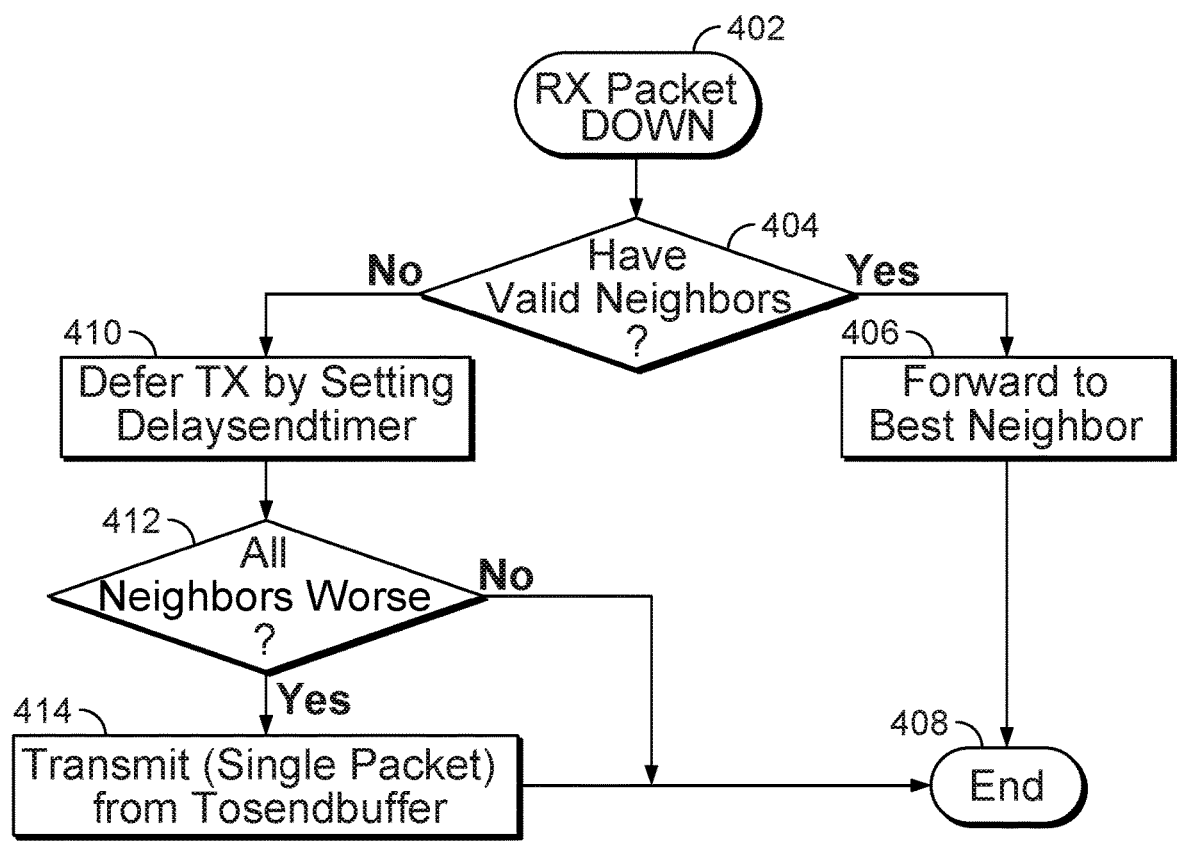
FIGS. 4-8 are flowcharts illustrating adaptive defer transmission operations.

FIGS. 4-8 are flowcharts illustrating example defer logic techniques, in accordance with the discussion herein. FIG. 4 illustrates a scenario wherein a packet is received by a network node from an upper layer (402), i.e., the network node is a source node. At 404, the network node determines whether the network node has valid neighbor nodes. For example, the network node may determine Have valid neighbors=(Best neighbor V-Value better than me OR ΔV>threshold) AND no other packets waiting in TosendBuffer. If true, at 406, the packet is forwarded to a best neighbor of the network node, and the process ends (408). If false, at 410, the node defers transmission of the packet by setting a delaySendTimer. At 412, if a reason for the network node not having valid neighbor nodes is because all its neighbor nodes have worse V-values, then a packet is transmitted from the TosendBuffer anyway, at 414. Otherwise, the process ends (408).

Figure 5:
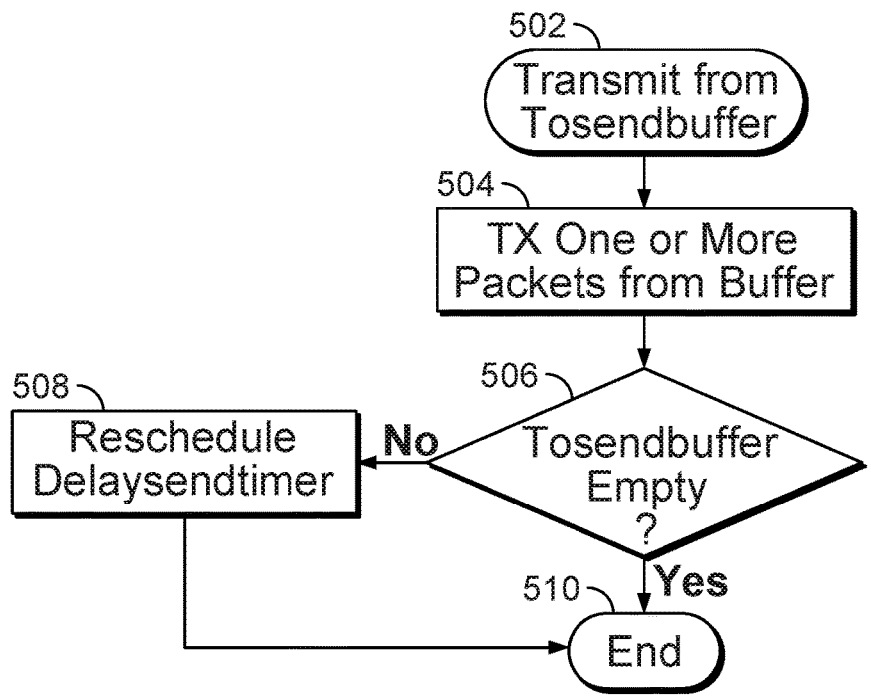

FIG. 5 is a flowchart illustrating a network node transmitting from a TosendBuffer. At 502, the network node transmits from a TosendBuffer. At 504, one or more packets are transmitted from the buffer. At 506, the node determines whether the TosendBuffer is empty. If true, at 508, the network node reschedules the TosendBuffer, and the process ends (510).

FIG. 6 illustrates a scenario wherein a packet is received by a network node from another node (602). At 604, the network node determines whether the packet is addressed to the receiving node (itself). If true, at 606, the network node determines whether the network node has valid neighbor nodes. If false, at 608, the network node determines whether a valid transmission path to the destination node exists. If true at 608, then at 610, the network node cancels a delaySendTimer. At 612, the network node determines TosendBuffer not empty AND have neighbor AND timers idle. If false, the process ends (614). If true, at 616, the network node determines whether a valid transmission path to the destination node exists. If true, at 618, the network node transmits multiple packets from the TosendBuffer and the process ends (614). If false, at 620, the network node transmits a single packet from the TosendBuffer and the process ends (614).

Returning to 606, if true, then at 622, the network node forwards the packet to a best neighbor of the network node, and control passes to 608.

If false at 606, then at 624, the network node sends the packet to the TosendBuffer and transmits an acknowledgment message. At 626, the network node determines whether all neighbors of the network node are worse than the network node. If true at 626, then control passes to 608. If false at 626, then at 628, the network node transmits a single packet from the TosendBuffer, and control passes to 608.

Figure 7:
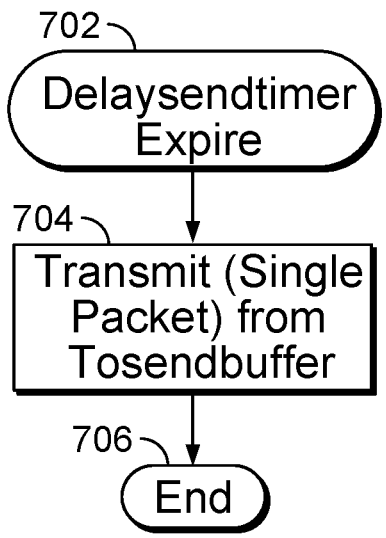
Figure 8:
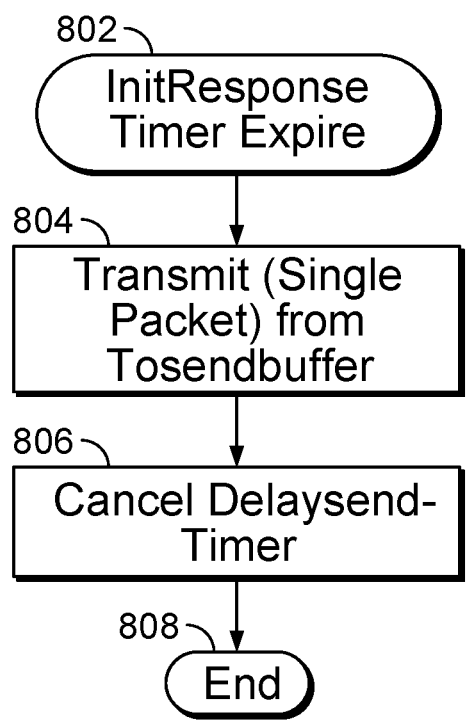

FIGS. 7-8 are flowcharts illustrating operations of timer expire handlers. FIG. 7 illustrates a scenario where a delaySendTimer expires (702). At 704, the node transmits a single packet from the TosendBuffer, and the process ends (706).

FIG. 8 illustrates a scenario where an initResponseTimer expires (802). At 804, the node transmits a single packet from the TosendBuffer. At 806, the node cancels the delaySend Timer, and the process ends (808).

Scenario 2: wait for better opportunity. An example technique for waiting for a better opportunity may include: when a network node is determining its options for forwarding a packet, additional options may (potentially) be created for delaying transmission to neighbor nodes that will be reached "soon" (e.g., in accordance with a predetermined threshold value). These options may then be evaluated along with the immediate transmit options that are considered currently and the "best" (e.g., in accordance with a determined lowest cost) may be decided. The additional options may be generated according to the following logic:
1. Calculate closest point of approach (CPA);
2. Determine time when CPA will occur;
3. Determine if soon enough (within a threshold);
   (a) If so, assign a Q-value (affected by packet size) and accept as valid option;
4. Choose best option—defer transmission (TX) if such a decision is selected.

A brief explanation of Q-learning and a baseline algorithm are discussed further below. As discussed in Plate et al., reinforcement learning (RL)-based routing algorithms may possess an ability to explore the network environment and adapt routing decisions to a constantly changing topology of the network due to node mobility, and energy usage. Plate et al. discusses a routing algorithm based on Q-learning, one of the RL approaches, with additional Kinematic and Sweeping features, referred to herein as QKS (Q-learning utilizing Kinematics and Sweeping).

A machine learning technique known as Q-learning is implemented in a routing algorithm known as Q-learning-based, Energy-efficient, Lifetime-extended, Adaptive Routing (QELAR) (see, e.g., Hu et al., "QELAR: A machine-learning-based adaptive routing protocol for energy-efficient and lifetime-extended underwater sensor networks," *IEEE Trans. Mobile Computing,* 9(6), pp. 798-809, Jun. 2010) to address a fully distributed network architecture.

Network nodes compute their own routing decisions by storing routing information (Q-values) of their direct neighbor nodes. In QELAR, the Q-value estimates consider the energy consumption of sensor nodes and residual energy distribution among neighboring nodes to optimize total energy consumption and network lifetime. The environment is learned as the estimated Q-values converge to reflect the network topology. However, convergence may occur slowly for certain network configurations such as those comprising a large number of network nodes and/or network nodes with high mobility, resulting in excess resource usage.

Plate et al. discusses two additional features that may improve the convergence rate of a basic Q-learning algorithm and its ability to track changes in the network while balancing the routing overhead. The first is the use of kinematic information to add a geographic component to the RL approach. Network nodes transmit their own position and velocity estimates and store those of their neighbor nodes to enable more accurate estimation of successful transmission probability, resulting in fewer failed transmissions. It may be assumed that a network node can estimate its own position and velocity (either independently or collaboratively) but is unaware of the destination node location.

The second is the addition of selective backward exploration (sweeping) to the forward exploration of QELAR, such that network nodes actively propagate significant changes in their Q-values back toward the source node. Although overhead cost may be increased with the addition of each feature, the improved convergence rate and tracking of network changes may result in an overall improvement in energy consumption and/or latency as compared to the baseline Q-routing approach. QKS (Q-learning utilizing Kinematics and Sweeping) refers to an algorithm discussed by Plate et al. that incorporates these features.

Q-learning-based routing algorithms are further discussed below. The sequential routing decision system can be modeled as a Markov Decision Process (MDP). The MDP may be characterized by its state set, action set, dynamics (set of state transition probabilities), and expected immediate reward.

Let $s_t$ and $a_t$ denote a state and action (decision), respectively, at time t. For the underwater network system, the state represents the location of the packet in the network and the action represents which of the one-hop neighbor nodes of s to which to forward.

Let $P_{s_t s_{t+1}}^{a_t}$ denote the probability of going from the current state, $s_t$, to the next state, $s_{t+1}$, when taking action $a_t$. $R_{s_t s_{t+1}}^{a_t}$ denotes the expected immediate reward for taking action $a_t$ at state $s_t$ and arriving at state $s_{t+1}$. Reward may include components related to energy usage, network lifetime, delay, and congestion depending on the mission operational objectives. The objective is to maximize the expected sum of rewards of actions leading from the source node to the destination node. An optimal solution may be obtained once the optimal value functions are found.

Value functions are functions of the states that provide a measure of how good it is to be in a given state (V), or of state-action pairs that estimate how good it is to perform a given action in a given state (Q). Optimal value functions, V* and Q* may satisfy:

$$V^*(s_t) = \max_{a_t} \sum_{s_{t+1}} P_{s_t s_{t+1}}^{a_t} \left[ R_{s_t s_{t+1}}^{a_t} + \gamma V^*(s_{t+1}) \right], \quad (6)$$

$$Q^*(s_t, a_t) = \sum_{s_{t+1}} P_{s_t s_{t+1}}^{a_t} \left[ R_{s_t s_{t+1}}^{a_t} + \gamma \max_{a_{t+1}} Q^*(s_{t+1}, a_{t+1}) \right], \quad (7)$$

where $0 \leq \gamma \leq 1$ is a discount parameter that determines an importance value of future rewards. The relation between V* and Q* may be denoted as:

$$V^*(s_t) = \max_{a_t} Q^*(s_t, a_t) \quad (8)$$

Value functions evaluated at given states are referred to herein as V-values, while functions evaluated as state-action pairs are referred to herein as Q-values. For mobile ad hoc underwater networks, where the system model of future behavior is not known at each network node, the optimal value functions are not known a priori, and also change as the network changes. In this situation, methods of estimating the optimal value functions may be employed to find advantageous routing decisions. Q-learning is a reinforcement learning method which iteratively approximates Q*.

QELAR is a routing algorithm for underwater sensor networks that implements a model-based Q-learning approach. The Q-values represent the estimated reward (based on energy usage) for a packet to reach the destination node from the neighboring nodes. Network nodes may approximate Eq. (7) to evaluate neighbor node Q-values and choose the neighbor with the maximum Q-value (Eq. (8)). The reward function may consider the initial node energy, residual energy, and the energy distribution of the neighboring nodes to balance choosing short paths with maximizing network lifetime. Each time a network node makes a routing decision, there are two possible outcomes that can occur: the action is successful and the state transitions to $s_{t+1}$; or the action fails and the state remains at the initial state, $s_t$. The reward function in the former case may be indicated as:

$$R_{s_t s_{t+1}}^{a_t} = -g - \alpha_1 [c(s_t) + c(s_{t+1})] + \alpha_2 [d(s_t) + d(s_{t+1})], \quad (9)$$

where g represents a constant cost accounting for the energy used in transmitting. The c(s) terms may provide an increasing penalty for transmitting to a node as that network node's ratio of energy available to initial energy decreases, and d(s) may provide a second penalty based on how much energy that node has relative to its neighbor nodes; $\alpha_1$ and $\alpha_2$ are weighting parameters. The reward for the failure case may be denoted as:

$$R_{s_t s_{t+1}}^{a_t} = -g\eta - \beta_1 c(s_t) + \beta_2 d(s_t), \quad (10)$$

where $\beta_1$ and $\beta_2$ are separate weighting parameters. In (10), an additional weight, $\eta > 1$, is introduced to scale g to account for the fact that a failed transmission will have not only its own transmission cost, but may incur a retransmission and therefore incur additional future costs. These modifications may advantageously improve performance in the case where a network node estimates all of its neighbor nodes to be undesirable (have lower V-values) as next hops (e.g., due to inaccurate V-value estimates). As an example, with $\eta = 1$, the network node may tend to choose the neighbor node with the lowest probability of successful transmission because it calculated that a failure was better than succeeding to any neighbor node (possibly not a beneficial choice). The addition of $\eta$ provides a penalty for failing above and beyond the penalty of merely remaining at the current state.

The reward for success and the reward for failure may be combined using the probabilities of each case occurring to produce an estimated reward for that action:

$$r_t = P_{s_t s_{t+1}}^{a_t} R_{s_t s_{t+1}}^{a_t} + P_{s_t s_t}^{a_t} R_{s_t s_t}^{a_t}, \quad (11)$$

and, based on Eq. (7), the Q function can then be denoted as:

$$Q(s_t, a_t) = r + \gamma [P_{s_t s_{t+1}}^{a_t} V(s_{t+1}) + P_{s_t s_t}^{a_t} V(s_t)]. \quad (12)$$

Transition probabilities to neighbor nodes may be estimated based on the success/failure history of a network node's forwarding actions.

When network nodes overhear neighboring forwarding transmissions, they may use the information obtained to update estimates of their neighbor nodes' V-values. In order to keep up with changing network topology, network nodes may also periodically transmit (broadcast) header-only packets with their V-value and energy information to neighbor nodes if they have not transmitted within a specified period of time (temporal interval). In this context, a "header-only" packet (i.e., "header packet") includes a header, but no payload, thus conserving bandwidth and energy. Thus, a combination of virtual experiments (e.g., calculated using Eq. (12)) and actual observation (overhearing neighbor node transmissions) may be employed to make routing decisions.

The QKS algorithm is discussed further below.

For networks comprising network nodes with high mobility, QELAR may use frequent periodic pinging to allow network nodes to update their P and V estimates. Inaccurate estimates may result in many transmission failures and therefore energy waste and potential network flooding. Additionally, a significant number of forwarding actions is used to accurately estimate the probability of successful transmission simply based on the history of which ones failed. This may lead to slow convergence, which may cause issues if the network is changing quickly. As an approach to mitigate these issues and improve the ability to predict state transition probabilities and enhance V-estimate convergence, neighbor kinematic data (position and velocity) and selective sweeping may be employed by QKS.

Although QELAR's scheme of learning transition probabilities from the success/failure rate of its history of forwarding actions may be effective for static networks, the mismatch between estimates and the actual environment may become significant for networks with high mobility, resulting in increased transmission failure rate. In order to achieve an advantageous system model for networks with mobile nodes, the kinematic state of the neighbor nodes is utilized.

Along with their V-values, network nodes may include their kinematic states (position and velocity) in transmitted packet headers so that their locations may be tracked by their neighbor nodes. It is assumed that each network node has some capability of estimating its own position and/or velocity. For example, this could be a Global Positioning System (GPS)-based system for surface nodes (buoys); submerged nodes (e.g., autonomous/unmanned underwater vehicles (AUV/UUVs)) may only have a basic inertial navigation system; fixed nodes (sensors) could be programmed with their locations at installation. For network nodes that are drifting with currents and do not have such navigation capabilities, a localization algorithm may be utilized that is based on communications with neighbor nodes. It may be noted that this is a more relaxed requirement than typical geographic routing approaches in that no network node needs to know the location of the destination node. Additionally, network nodes do not need to precisely know their locations; an uncertainty in node estimate may be expected.

Network nodes may employ a link model of the medium (either known a priori or learned) to estimate the probability of successful transmission to its neighbor nodes based on transmission distance. For example, a transmission success probability model may be generated as a function of transmission power and distance using empirical equations to model sound propagation underwater.

This may be developed by running Monte-Carlo simulations of a closely-spaced, uniform line of network nodes with a source node transmitting packets at one end of the line. The number of packets successfully received at each network node may be counted and from this a probability of success as a function of distance may be determined for various transmission power levels. The empirical equations used to model the environment account for propagation delay, attenuation due to spreading and absorption, and background noise including turbulence, shipping noise, surface agitation, and thermal noise. Thus, it may not account for specific properties of any particular environment such as sound velocity profiles or bathymetry, but may be interpreted as an expected performance for a generic, uniform environment. Expected deviations of a real environment from the model may be included as normally distributed error terms.

Modeled transmission success probabilities may be determined as:

$$P = -\frac{s_{size}}{\pi}\arctan\frac{(r-r_{0.5})*s_{slope}}{r_{0.5}} + v_{shift}, \quad (13)$$

where $s_{size}$ is an overall scaling parameter set to 1.3 and $s_{slope}$ is a scaling parameter that affects the slope of the arctangent curve, computed from a 3rd-order polynomial.

The parameter $v_{shift}$ may determine the vertical shift of the curve (computed from a 1st-order polynomial) and $r_{0.5}$ is the range at which the probability of successful transmission is 0.5 (computed from two different polynomials (5th order and 3rd order, respectively)). All polynomials are functions of transmission power and their coefficients were obtained by curve-fitting using a least-squares technique.

In the case where the properties of the acoustic environment are not known a priori, these parameters may be updated using an adaptive learning scheme. Such an example technique may thus include a model that leverages geographic information, as opposed to the more simplistic method of solely using past transmission history as used by the QELAR algorithm. However, QKS further employs a method of adapting the probability based on transmission history as well: if a user-specified number of successive failures occur, the estimated probability may be decreased by a fixed amount (e.g., amount set to 0.2) below what is calculated from the geographic model, reflecting an assumption of inaccurate kinematic information or model mismatch with the environment. The position estimate of the neighbor node may be revised to be consistent with this new P-value estimate by moving it along the line connecting the transmitting network node with the neighbor node such that the new range corresponds to that which would be expected from the probability model; the velocity estimate is reset to 0.

Network nodes may maintain current estimates of their own kinematic states and also those of their neighbor nodes using individual Kalman Filters (one for itself and for each neighbor node). When packets are received/overheard from neighbor nodes, the sender's position and velocity information is injected as a measurement to the appropriate filter. Nodes may receive a measurement update of their own position and/or velocity (depending on the node's navigation capabilities) as frequently as their navigation system provides. In between measurement updates, position and velocity states are propagated forward (time updates) using a nearly constant velocity motion model.

As network nodes learn their own V-values by communicating with neighbor nodes, there may be significant changes in their estimated values due to initial learning or changes in the network. Under normal operation, these changes may gradually be shared as more data packets are transmitted and overheard by other network nodes. As discussed by Plate et al., selective backward sweeping is a method of accelerating convergence by actively propagating these changes in network nodes' V-values (due to learning or movement) back toward the source node rather than waiting for them to percolate backward as a natural product of forwarding packets. Somewhat similar to QELAR, each time a network node receives or overhears a neighbor node's transmissions, it updates its own estimate of that node's V-value. However, instead of waiting until its next transmission time to compute its own V-value, it does so immediately and compares its change in V-value, $\delta V$, to a predefined threshold, $\Theta$. If $\delta V > \Theta$, it may initiate forwarding a header-only packet (i.e., a header packet) with its updated information so that its neighbor nodes have access to this information.

To control the spreading of backward sweeping packets, an additional set of V-values are maintained at each network node corresponding to the estimated maximum reward of going backward to reach the source node. Thus, $Q^s$ ($V^s$) and $Q^d$ ($V^d$) denote the Q-values (V-values) associated with directing packets toward the source node and destination node, respectively. In this sweeping approach, new packets are generated that contain only node header information and the $Q^s$-values are used to route these new packets back toward the source node to spread local information quickly to network nodes that are not direct neighbors.

The "selective" aspect of the technique may be implemented by including a prioritized list of network nodes in each packet header that indicates which ones are "allowed" to initiate backward packets. The network nodes may be chosen according to minimum $V^s$, which may result in the backward packets being steered toward the source node. Thus, the header of each packet includes the network node's estimate of $V_t^s$ in addition to $V_t^d$, and also a list of backward forwarder ID's. A depth parameter may be included which defines how many network nodes to select as backward forwarders at each transmission.

While there may be an additional overhead cost to perform the backward sweeping technique, there may still be an overall improvement in terms of reduced energy usage. The benefit obtained in terms of improved convergence rate may be effective in reducing the total number of data packet transmissions, reducing total energy usage, and therefore outweighing the cost of transmitting the sweeping packets.

Summarizing the above discussion, the geographic component leverages node estimates of position and velocity to track neighbor kinematic information over time and may use this information to increase the learning rate of the algorithm. This not only benefits learning an unknown network for the first time, but also allows the algorithm to cope with higher rates of mobility.

The selective backward sweeping may also improve learning rate and the algorithm's ability to detect and adapt to changes in the network due to node mobility or changes in the environment. In general, changes in node V-values are propagated through the network by forwarding normal data packets and including the V-value and kinematic information in the packet header. However, the selective backward sweeping may increase the sharing of this information by transmitting additional header-only packets when a node makes a change to its own V-value that may be determined as a significant change. It is "selective" in the sense that these packets are directed back towards the source node using a similar routing scheme as is used in the forward direction, with nodes updating their own V-values along the way and only continuing the propagation if they both incur a significant change and are also along the path to the source.

Further, an adaptive source control technique may leverage a capability of estimating reliable transmission paths to the destination node. If a reliable transmission path is estimated to exist, the source node may increase its packet generation rate in order to take advantage of available network throughput. If the network is unknown or a transmission path is not found, a slower packet generation rate may be used so as to not overload the network. Additionally, an example technique may be used by a network node to defer transmissions of received packets to a later time if deemed desirable. This may occur due to either network nodes not having any better neighbor nodes than themselves (such as may occur if the destination moves and is temporarily not reachable) or due to two nodes moving closer to each other and the transmitting node desiring to wait until they are close enough to communicate optically rather than transmitting immediately using acoustics.

In accordance with example techniques discussed herein, a multi-modal decision capability implemented in the algorithm may automatically determine whether to use acoustic or optical modality on a per-transmission basis. This may be integrated into the neighbor selection, with a few differences:

(1) Node V-values computed using optical mode may be used only to determine what neighbor/mode pair to use for forwarding the packet. Actual V-value updates may be calculated only using the acoustic transmission capabilities. Since optical transmission range is so much smaller than acoustic range, and network nodes are assumed to be comparatively sparse, there may be a high rate of change in V-value if the optical mode were included in its calculation. The learning rate of the network may often not be capable of tracking this rate of change given the frequency of packet transmissions supported.

(2) The estimates of windows where a valid transmission path to the destination node is available may be calculated only using acoustic transmission capabilities.

Windows may be much shorter (perhaps non-existent) if optical mode were used due to the short duration of when nodes would be within optical range of each other.

In some embodiments, the reward calculation may be modified in the multi-modal algorithm to account for the energy for transmitting and the expected latency of the transmission to more fairly evaluate between making an acoustic transmission and an optical one. Optical transmissions will likely have significantly lower latencies due to the high data rates compared to acoustics, and will also typically require less energy due to the reduced time spent in the transmitting mode. The reward may thus be calculated as:

$$R_{s_t s_{t+1}}^{a_t} = -g - \alpha_3 E - \alpha_4 e^{\frac{L}{\tau}} - \alpha_1 [c(s_t) + c(s_{t+1})] + \alpha_2 [d(s_t) + d(s_{t+1})]. \quad (14)$$

The constant cost, g, is augmented by the energy and latency terms. Including both of these terms as well as a fixed cost allows greater control over how much to weight the energy/latency savings for optical transmissions while maintaining a cost that is commensurate with the discount factor.

In some embodiments, only the acoustic modality may be considered to determine the neighbor node to which to forward, and then optics may be considered as an option to get there in a second layer process.

Testing experiments have shown that, if there are different costs incurred with a large variance between them (e.g., acoustics and optics) then the V-value learning may be adversely affected because the discounting will not affect both costs equally.

For example, updating V-value using various modes may result in optical links that may be short lived, resulting in rapid changes in V-value which may reduce the ability of the network to learn. As a solution to this, acoustics may be used for all node V-value updates, even when transmitting optically.

As another example, discount of optical reward calculations are scaled to acoustic costs which are much larger. This may lead to scenarios where a node's V-value increases as a result of transmitting to a neighbor node with a lower V-value. That is, transmitting to a "worse" node may cause a network node to think it is in a better position than it was before.

As a solution, decisions on mode may be made hierarchically. For example, a determination may be made of which neighbor node to which to forward purely based on acoustic mode, or whether to wait and transmit optically at some time in the future. Then, if an optical link is available, optics may be used to forward the packet.

Regarding the second problem above, this may occur in a scenario as discussed below. When deciding among forwarding options, the acoustic option, using reward $r_A$, for transmitting from a given network node, n, to a certain neighbor node, m, is calculated as:

$$Q_A = r_A + \gamma(P_{nm}V_m + P_{nn}V_n) \qquad (15)$$
$$= -3.69 + 0.85(-13.5*1)$$
$$= -15.17$$

where the probability of successful transmission $P_{nm}=1$, $V_m$ is the neighbor's V-value, and $\gamma$ is the discount factor. The Q-value for reaching the same neighbor node using optics is calculated as:

$$Q_O = r_O + \gamma(P_{nm}V_m + P_{nn}V_n) \qquad (16)$$
$$= -1.14 + 0.85(-13.5*1)$$
$$= -12.62$$

It may be observed that for the acoustics case, the Q-value is appropriately less than the neighbor node due to the cost involved in carrying out the transmission. For the optical case, with a reduced cost due to significantly shorter transmit time, the discount due to $\gamma$ is higher than the cost $R_O$ and the result is a higher Q-value than the network node's current V-value. It may be noted, however, that the network node would update its V-value according to the acoustic Q-value due to the solution above (i.e., using acoustics for all node V-value updates, even when transmitting optically), and thus, advantageously, this may not result in an iterative situation of the pair of network nodes continually improving their V-values by transmitting optically to each other.

Example aspects discussed herein may be implemented as a series of modules, either functioning alone or in concert with physical electronic and computer hardware devices. Example techniques discussed herein may be implemented as a program product comprising a plurality of such modules, which may be displayed for a user. As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Such modules may be utilized separately and/or together locally and/or remotely to form a program product thereof, that may be implemented through non-transitory machine readable recordable media.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 9:
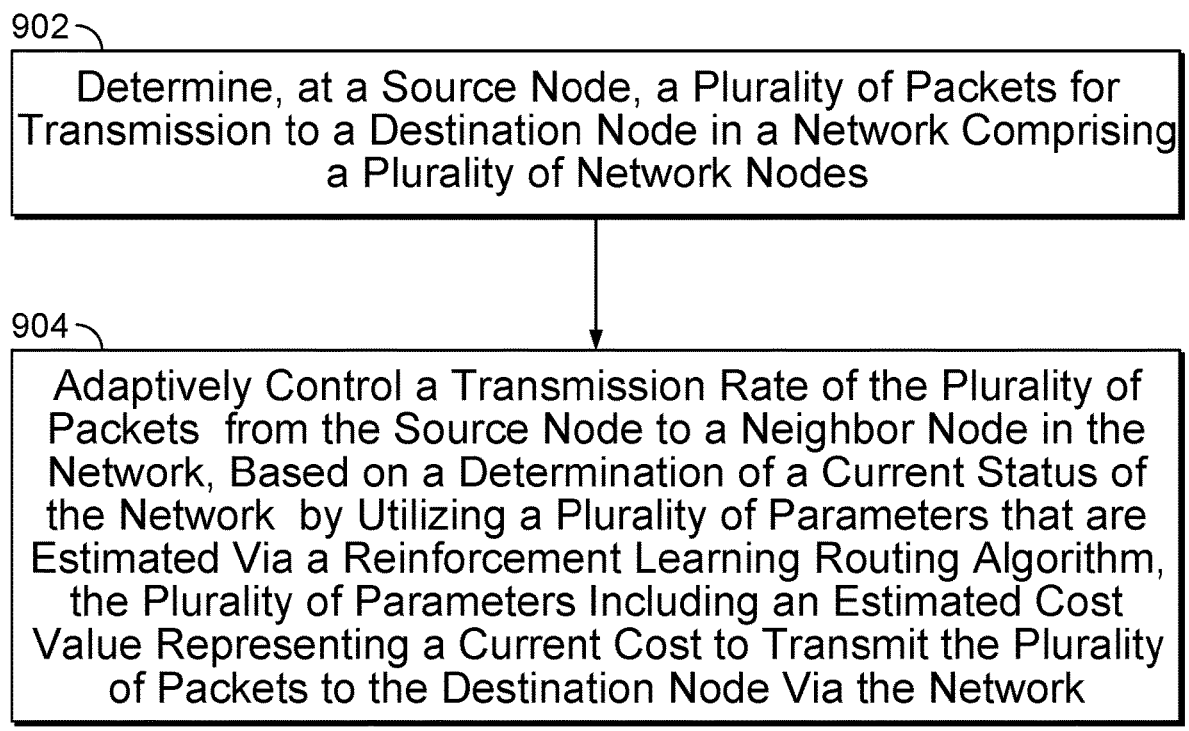
FIG. 9 is a flowchart illustrating adaptive packet transmission operations.

FIG. 9 is a flowchart illustrating example operations of the system of FIG. 3, according to example embodiments. As shown in the example of FIG. 9, at a source node, a plurality of packets may be determined for transmission to a destination node in a network comprising a plurality of network nodes (902).

A transmission of the plurality of packets from the source node to a neighbor node in the network may be adaptively controlled, based on a determination of a current status of the network by utilizing a plurality of parameters that are estimated via a reinforcement learning routing algorithm, the plurality of parameters including an estimated cost value representing a current cost to transmit the plurality of packets to the destination node via the network (904).

For example, determining the plurality of packets may include adapting a generation rate of the plurality of packets based on the determination of the current status of the network.

For example, the network may include an underwater network.

For example, a plurality of header estimates may be received, in one or more packet headers, from a set of the plurality of network nodes, wherein each of the header estimates includes an individual node estimate of a duration and confidence of a transmission path from an individual node to a direct neighbor node of the individual node, wherein the duration includes a start time and an end time.

For example, an individual node estimate of a duration and confidence of a transmission path from the neighbor node to the destination node may be received, in a packet header broadcast by the neighbor node, wherein the duration includes a start time and an end time, the individual node estimate of the duration and confidence determined by the neighbor node, based on shared geographic data indicating estimated locations of a set of the plurality of the network nodes during the duration.

For example, at least one packet may be generated and received based on a result of a determination whether any network node of the plurality of network nodes currently qualifies as a beneficial neighbor node for receiving and forwarding packets to the destination node, wherein a determination of a beneficial neighbor node is based on an estimated cost to transmit packets to the destination node from a set of the plurality of network nodes that are direct neighbors of the source node.

Figure 10:
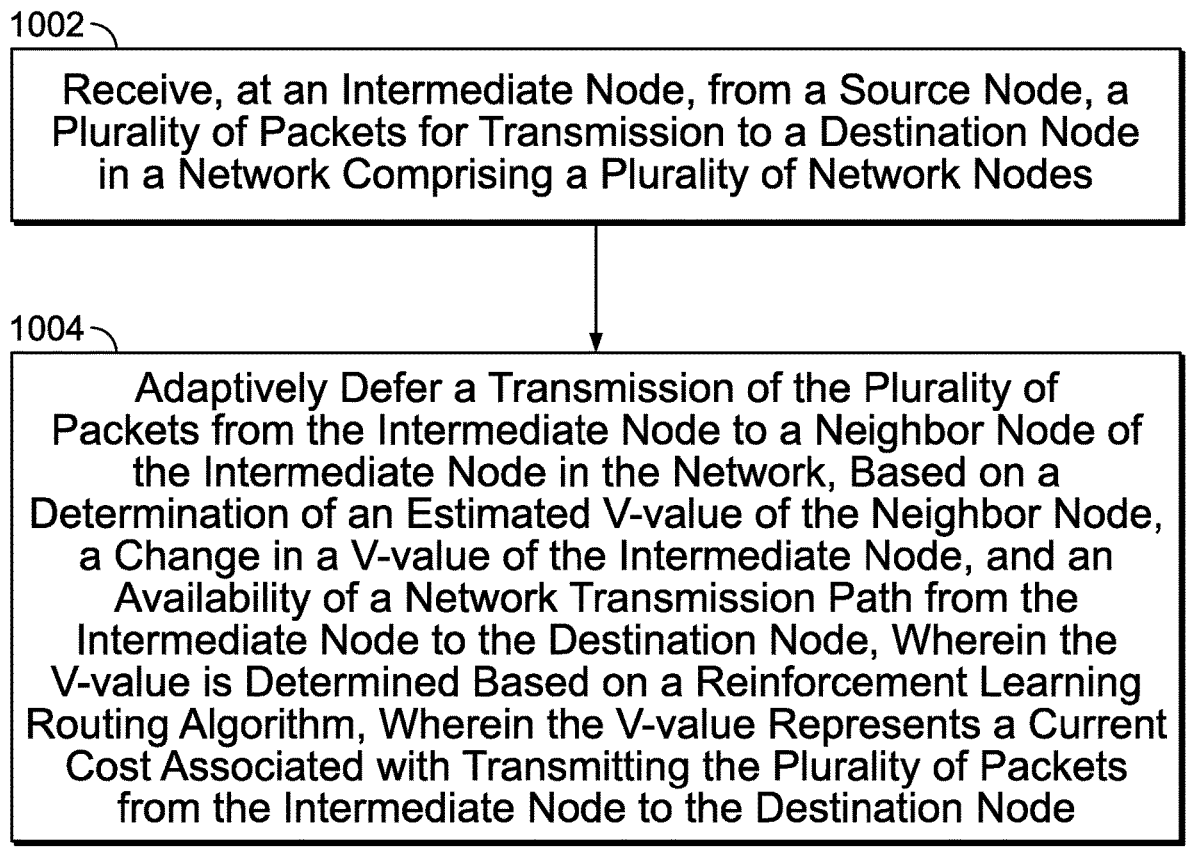
FIG. 10 is a flowchart illustrating adaptive packet deferred transmission operations.

FIG. 10 is a flowchart illustrating example operations of the system of FIG. 3, according to example embodiments. As shown in the example of FIG. 10, at an intermediate node, a plurality of packets may be received, from a source node, for transmission to a destination node in a network comprising a plurality of network nodes (1002).

A transmission of the plurality of packets from the intermediate node to a neighbor node of the intermediate node in the network may be adaptively deferred, based on a determination of an estimated V-value of the neighbor node, a change in a V-value of the intermediate node, and an availability of a network transmission path from the intermediate node to the destination node, wherein the V-value is determined based on a reinforcement learning routing algorithm, wherein the V-value represents a current cost associated with transmitting the plurality of packets from the intermediate node to the destination node (1004).

For example, at the intermediate node, a duration estimate of a duration of the network transmission path from the intermediate node to the destination node, and a confidence estimate of that duration, may be calculated and relayed, based on shared geographic data representing estimated locations of the plurality of network nodes during the duration.

For example, the duration estimate of the duration may include a start time and an end time representing a temporal window of network connectivity for transmission of the plurality of packets from the intermediate node to a direct neighbor node that is determined as a best neighbor node of the intermediate node.

For example, adaptively deferring the transmission may include deferring the transmission based on a determination that the change in the V-value of the intermediate node is less than a predetermined threshold value, and a determination that there are currently no valid neighbor nodes of the intermediate node for receiving the transmission for forwarding of the plurality of packets.

For example, adaptively deferring the transmission may include initiating transmission of the plurality of packets based on a determination that at least one network node previously disconnected from the network has re-connected to the network, wherein at least one network node is currently located in a network path from the intermediated node to the destination node.

For example, at the intermediate node, waiting packets may be transmitted from a buffer of the intermediate node, based on a determination that a valid transmission path currently exists from the intermediate node to the destination node.

For example, adaptively deferring the transmission may include setting a timer at the intermediate node providing an amount of time by which to defer the transmission.

For example, adaptively deferring the transmission may include sending a packet to a buffer configured to store deferred packets, and transmitting an acknowledgment message that communicates receipt of the packet that is sent to the buffer.

For example, adaptively deferring the transmission may include transmitting either a single packet or multiple packets from the buffer, based on a determination of whether a valid transmission path to the destination node exists.

For example, adaptively deferring the transmission may include transmitting at least a single packet from the buffer, based on a determination that a timer at the intermediate node for providing an amount of time by which to defer the transmission, has expired.

FIG. 11 is a flowchart illustrating example operations of the system of FIG. 3, according to example embodiments. As shown in the example of FIG. 11, at a source node in a network of a plurality of network nodes, a generation rate of generating, at the source node, a plurality of generated packets for transmission to a destination node in the network of the plurality of network nodes may be controlled by an adaptive transmission controller that controls transmission of generated packets (1102).

A rate of transmission of the plurality of generated packets from the source node to an intermediate node in the network of the plurality of network nodes may be adaptively controlled by the adaptive transmission controller, based on a determination of a current status of the network of the plurality of network nodes by utilizing a plurality of parameters that are estimated via a reinforcement learning routing algorithm, the plurality of parameters including an estimated cost value representing a current cost to transmit the plurality of packets to the destination node via the network of the plurality of network nodes (1104).

A plurality of packets may be received at the source node from an intermediate node of the network of the plurality of network nodes, the forwarding of which may be controlled by an adaptive defer transmission controller that controls deferral of transmission of received packets (1106).

Transmission of the plurality of received packets from the source node to a neighbor node of the source node in the network of the plurality of network nodes may be adaptively deferred by the adaptive defer transmission controller, based on a determination of an estimated V-value of the neighbor node, a change in a V-value of the source node, and an availability of a network transmission path from the source node to the destination node, wherein the V-value is determined based on the reinforcement learning routing algorithm, wherein the V-value represents a current cost associated with transmitting the plurality of received packets from the source node to the destination node (1108).

For example, a plurality of header estimates may be received by the adaptive transmission controller, in one or more packet headers, from a set of the plurality of network nodes, wherein each of the header estimates includes an individual node estimate of a duration and confidence of a transmission path from an individual node to a direct neighbor node of the individual node, wherein the duration includes a start time and an end time.

For example, transmission of the plurality of generated packets may be controlled by the adaptive transmission controller by determining an optimal packet generation rate that is calculated to utilize available channel capacity, without flooding the network.

For example, a duration estimate of a duration and a confidence estimate of a confidence value of the network transmission path from any network node to the destination node may be calculated and relayed by the defer transmission controller, based on shared geographic data representing estimated locations of the plurality of network nodes during the duration.

One skilled in the art of computing will appreciate that many other types of techniques may be used for adaptively controlling transmissions in networks, without departing from the discussion herein.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

For example, the one or more processors (e.g., hardware device processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for an ad-hoc network having a plurality of nodes including a source node and a destination node, the method comprising, at each intermediate one of the nodes besides the destination node:

measuring a current position and a current velocity of the intermediate node;

maintaining an estimated position and an estimated velocity for each of the nodes in a neighboring subset of the nodes;

broadcasting at least one transmitted packet including the current position and the current velocity of the intermediate node;

correspondingly receiving at least one received packet from at least a proximate one of the nodes, the received packet including a current position and a current velocity of the proximate node;

updating the estimated position and the estimated velocity of the proximate node with the current position and the current velocity from the received packet;

calculating a hop duration of a respective reliable link between the intermediate node and each of at least a neighbor one of the nodes in the neighboring subset, including calculating the hop duration from the current position and the current velocity measured for the intermediate node and from the estimated position and the estimated velocity maintained for the neighbor node;

determining, at the intermediate node that is the source node, a payload packet for transmission from the source node to the destination node via the ad-hoc network; and adaptively controlling, at the intermediate node that is the source node, a transmission rate of the payload packet from the source node to the neighbor node of the source node in the ad-hoc network, based on an estimated V-value of the neighbor node, a change in a self V-value of the intermediate node, and the hop duration of the respective reliable link between the source node and the neighbor node, wherein the self V-value and the estimated V-value are determined from a reinforcement learning routing algorithm, the self V-value converging to a current cost to transmit the payload packet from the source node to the destination node via the ad-hoc network, and the estimated V-value converging to a current cost to transmit the payload packet from the neighbor node to the destination node via the ad-hoc network, wherein the broadcasting includes broadcasting the transmitted packet having a header including a path duration of a network path and a confidence of the network path from the intermediate node to the destination node via the ad-hoc network, wherein the path duration includes a start time and an end time inside the hop duration of the respective reliable link between the intermediate node and the neighbor node, which is a next one of the nodes along the network path, and the correspondingly receiving includes from the proximate node that is the neighbor node correspondingly receiving the received packet having the header including a path duration of a portion the network path following the neighbor node and a confidence of the portion from the neighbor node to the destination node via the ad-hoc network, wherein the path duration received includes a start time and an end time.

2. The method of claim 1, wherein:
the determining includes adapting a generation rate of a plurality of payload packets to match the transmission rate.

3. The method of claim 1, wherein the ad-hoc network includes an underwater ad-hoc network.

4. The method of claim 1, wherein:
the broadcasting includes broadcasting the transmitted packet having the header including the current position and the current velocity of the intermediate node and the self V-value of the intermediate node representing a current cost to transmit the payload packet from the intermediate node to the destination node via the ad-hoc network; and the correspondingly receiving includes from the proximate node correspondingly receiving the received packet having the header including the current position and the current velocity of the proximate node and a self V-value of the proximate node representing a current cost to transmit the payload packet from the proximate node to the destination node via the ad-hoc network, wherein, in accordance with the reinforcement learning routing algorithm, the method further comprises:

at the intermediate node, maintaining and updating the estimated V-value of the proximate node with the self V-value of the proximate node from the received packet; and at the intermediate node, maintaining and updating the self V-value of the intermediate node based on the self V-value of the proximate node from the received packet, wherein the change in the self V value of the intermediate node is a difference before and after the updating, wherein the broadcasting further includes, immediately after the updating when the change in the self V-value is not less than a predetermined threshold value, broadcasting the transmitted packet having the header including the self V-value of the intermediate node after the updating.

5. The method of claim 1, wherein:

the determining includes generating and transmitting a plurality of payload packets from the source node while any one of the nodes currently qualifies as a beneficial neighbor node for receiving and forwarding packets to the destination node, wherein the beneficial neighbor node is in the neighboring subset and has the estimated V-value with a lower cost than the self V-value of the source node.

6. A method for an ad-hoc network having a plurality of nodes including a source node and a destination node, the method comprising, at each intermediate one of the nodes besides the destination node:

measuring a current position and a current velocity of the intermediate node;

maintaining an estimated position and an estimated velocity for each of the nodes in a neighboring subset of the nodes;

broadcasting at least one transmitted packet including the current position and the current velocity of the intermediate node;

correspondingly receiving at least one received packet from at least a proximate one of the nodes, the received packet including a current position and a current velocity of the proximate node;

updating the estimated position and the estimated velocity of the proximate node with the current position and the current velocity from the received packet;

calculating a hop duration of a respective reliable link between the intermediate node and each of at least a neighbor one of the nodes in the neighboring subset, including calculating the hop duration from the current position and the current velocity measured for the intermediate node and from the estimated position and the estimated velocity maintained for the neighbor node;

receiving a payload packet for transmission from the source node to the destination node via the ad-hoc network; and adaptively deferring a transmission of the payload packet from the intermediate node to the neighbor node of the intermediate node in the ad-hoc network, based on an estimated V-value of the neighbor node, a change in a self V-value of the intermediate node, and the hop duration of the respective reliable link between the intermediate node and the neighbor node, wherein the estimated V-value and the self V-value are determined from a reinforcement learning routing algorithm, the self V-value converges to a current cost of transmitting the payload packet from the intermediate node to the destination node, and the estimated V-value converges to a current cost of transmitting the payload packet from the neighbor node to the destination node via the ad-hoc network, wherein the broadcasting includes broadcasting the transmitted packet having a header including a path duration of a network path and a confidence of the network path from the intermediate node to the destination node via the ad-hoc network, wherein the path duration includes a start time and an end time inside the hop duration of the respective reliable link between the intermediate node and the neighbor node, which is a next one of the nodes along the network path, and the correspondingly receiving includes from the proximate node that is the neighbor node correspondingly receiving the received packet having the header including a path duration of a portion the network path following the neighbor node and a confidence of the portion from the neighbor node to the destination node via the ad-hoc network, wherein the path duration received includes a start time and an end time.

7. The method of claim 6, wherein:

the broadcasting includes broadcasting the transmitted packet including the path duration and the confidence of the network path from the intermediate node to the destination node, the path duration inside the hop duration of the respective reliable link between every successive pair of the nodes along the network path.

8. The method of claim 6, wherein: the hop duration has the start time and the end time of the respective reliable link from the intermediate node to the neighbor node that is a best neighbor node of the intermediate node because the estimated V-value of the best neighbor node has a lowest cost among all of the nodes in the neighboring subset of the intermediate node.

9. The method of claim 6, wherein:

the adaptively deferring the transmission includes deferring the transmission of the payload packet while the change in the self V-value of the intermediate node is less than a predetermined threshold value and while temporally outside the hop duration of the respective reliable link between the intermediate node and every one of the nodes in the neighboring subset, but not deferring the transmission of the payload packet while the change in the self V-value is not less than the predetermined threshold value even when temporally outside the hop duration of the respective reliable link between the intermediate node and every one of the nodes in the neighboring subset.

10. The method of claim 6, wherein:

the adaptively deferring the transmission includes initiating transmission of the payload packet when at least one of the nodes previously disconnected from the ad-hoc network has re-connected to the ad-hoc network, wherein the at least one re-connected node is currently located in the network path from the intermediate node to the destination node.

11. The method of claim 6, further comprising:

at the intermediate node, broadcasting waiting packets from a buffer of the intermediate node, in addition to broadcasting the payload packet when a valid network path currently exists from the intermediate node to the destination node.

12. The method of claim 6, wherein:

the adaptively deferring the transmission includes setting a timer at the intermediate node providing an amount of time by which to defer the transmission.

13. The method of claim 6, wherein:

the adaptively deferring the transmission includes sending the payload packet to a buffer configured to store deferred packets, and broadcasting an acknowledgment message that communicates receipt of the payload packet.

14. The method of claim 13, wherein:
the adaptively deferring the transmission includes broadcasting either a single packet or multiple packets from the buffer when a valid network path currently exists from the intermediate node to the destination node.

15. The method of claim 14, wherein:
the adaptively deferring the transmission includes broadcasting at least a single packet from the buffer when a timer expires at the intermediate node for providing a time limit on deferring the transmission.

16. The method of claim 5, wherein:
the calculating the hop duration includes calculating a separation distance between the intermediate node and each neighbor node in the neighboring subset, including calculating the separation distance from the current position and the current velocity of the intermediate node and from the estimated position and the estimated velocity of the neighbor node,
wherein the hop duration of the respective reliable link between the intermediate node and each neighbor node in the neighboring subset has a start time and an end time spanning an in-between time of closest approach between the intermediate node and the neighbor node, with the end time after the in-between time when the intermediate node and the neighbor node are expected to no longer communicate reliably due to the separation distance exceeding a communication range.

17. A system comprising: a source node in an ad-hoc network of a plurality of network nodes, which include a destination node, the source node including:
at least one hardware device processor adapted to:
measure a current position and a current velocity of the source node;
maintain an estimated position and an estimated velocity for each of the network nodes in a neighboring subset of the network nodes;
broadcast at least one transmitted packet including the current position and the current velocity of the source node;
correspondingly receive at least one received packet from at least a proximate one of the network nodes, the received packet including a current position and a current velocity of the proximate node;
update the estimated position and the estimated velocity of the proximate node with the current position and the current velocity from the received packet;
calculate a hop duration of a respective reliable link between the source node and each of at least a neighbor one of the network nodes in the neighboring subset, including calculating the hop duration from the current position and the current velocity measured for the source node and from the estimated position and the estimated velocity maintained for the neighbor node,
wherein the broadcast includes broadcast the transmitted packet having a header including a path duration of a network path and a confidence of the network path from the source node to the destination node via the ad-hoc network, wherein the path duration includes a start time and an end time inside the hop duration of the respective reliable link between the source node and the neighbor node, which is a next one of the network nodes along the network path, and
the correspondingly receive includes from the proximate node that is the neighbor node correspondingly receive the received packet having the header including a path duration of a portion the network path following the neighbor node and a confidence of the portion from the neighbor node to the destination node via the ad-hoc network, wherein the path duration received includes a start time and an end time;
an adaptive transmission controller that controls transmission of a plurality of generated packets by:
adaptively controlling a generation rate, at the source node, of the plurality of generated packets for transmission to the destination node in the ad-hoc network, wherein the generation rate is based on an estimated V-value of the neighbor node, a change in a self V-value of the source node, and the hop duration of the respective reliable link between the source node and the neighbor node, wherein the estimated V-value is determined from a reinforcement learning routing algorithm, the estimated V-value converging to a current energy cost to transmit each of the plurality of generated packets from the neighbor node to the destination node via the ad-hoc network; and
an adaptive defer controller that controls deferral of transmission of a plurality of received packets by:
adaptively deferring transmission of the plurality of received packets from the source node to the neighbor node of the source node in the ad-hoc network, based on the estimated V-value of the neighbor node, the change in the self V-value of the source node, and the hop duration of the respective reliable link between the source node and the neighbor node, wherein the self V-value is determined from the reinforcement learning routing algorithm, and the self V-value converges to a current energy cost of transmitting each of the plurality of received packets from the source node to the destination node via the ad-hoc network.

18. The system of claim 17, wherein the adaptive transmission controller controls transmission of the plurality of generated packets by determining an optimal rate for the generation rate, the optimal rate calculated to utilize available channel capacity, without flooding the ad-hoc network.

19. The system of claim 17, wherein the defer controller utilizes the path duration and the confidence of the network path from the source node to the destination node.

* * * * *